United States Patent [19]

Hanna

[11] 4,374,496
[45] Feb. 22, 1983

[54] VEHICLE CONVEYOR

[76] Inventor: Daniel C. Hanna, 1133 SW. Rivington Dr., Portland, Oreg. 97201

[21] Appl. No.: 221,709

[22] Filed: Dec. 31, 1980

[51] Int. Cl.³ .................. B61B 10/04; B61B 13/12; B65G 17/24; B65G 19/26
[52] U.S. Cl. .............................. 104/172 B; 198/732
[58] Field of Search ..................... 104/172 B; 198/732

[56] References Cited

U.S. PATENT DOCUMENTS

| Re. 30,026 | 6/1979 | Hanna et al. | 104/172 B |
|---|---|---|---|
| 3,554,132 | 1/1971 | Hanna et al. | 104/172 B |
| 3,596,605 | 8/1971 | Shelstad | 104/172 B |
| 3,693,392 | 9/1972 | Watson | 104/172 B |
| 3,815,512 | 6/1974 | Balas | 104/172 B |
| 4,194,449 | 3/1980 | Breau | 104/172 B |
| 4,266,482 | 5/1981 | Barber | 104/172 B |

Primary Examiner—Robert B. Reeves
Assistant Examiner—Howard Beltran
Attorney, Agent, or Firm—Klarquist, Sparkman, Campbell, Leigh, Whinston & Dellett

[57] ABSTRACT

A conveyor for transporting a vehicle along a track through a carwash is adapted to selectively lift a roller mechanism through a first opening at the forward end of the tire track for engaging the front tire of a vehicle to convey the vehicle along the track until the rear tire moves beyond the first opening whereupon the roller mechanism engaging the front tire drops through another opening at an intermediate location along the track and a second roller mechanism is lifted through the first opening behind the rear tire so as to engage the rear tire and then convey the vehicle to the rearward end of the tire track. An improved roller mechanism is provided with three pairs of rollers consisting of a first pair adapted to travel above the tire track, a second pair adapted to travel on the top surface of the tire track, and a third adapted to travel below the tire track, the first roller pair being disposed at a predetermined height above the tire track for more efficiently transferring force to the tire of the vehicle while conveying the vehicle along the track.

1 Claim, 8 Drawing Figures

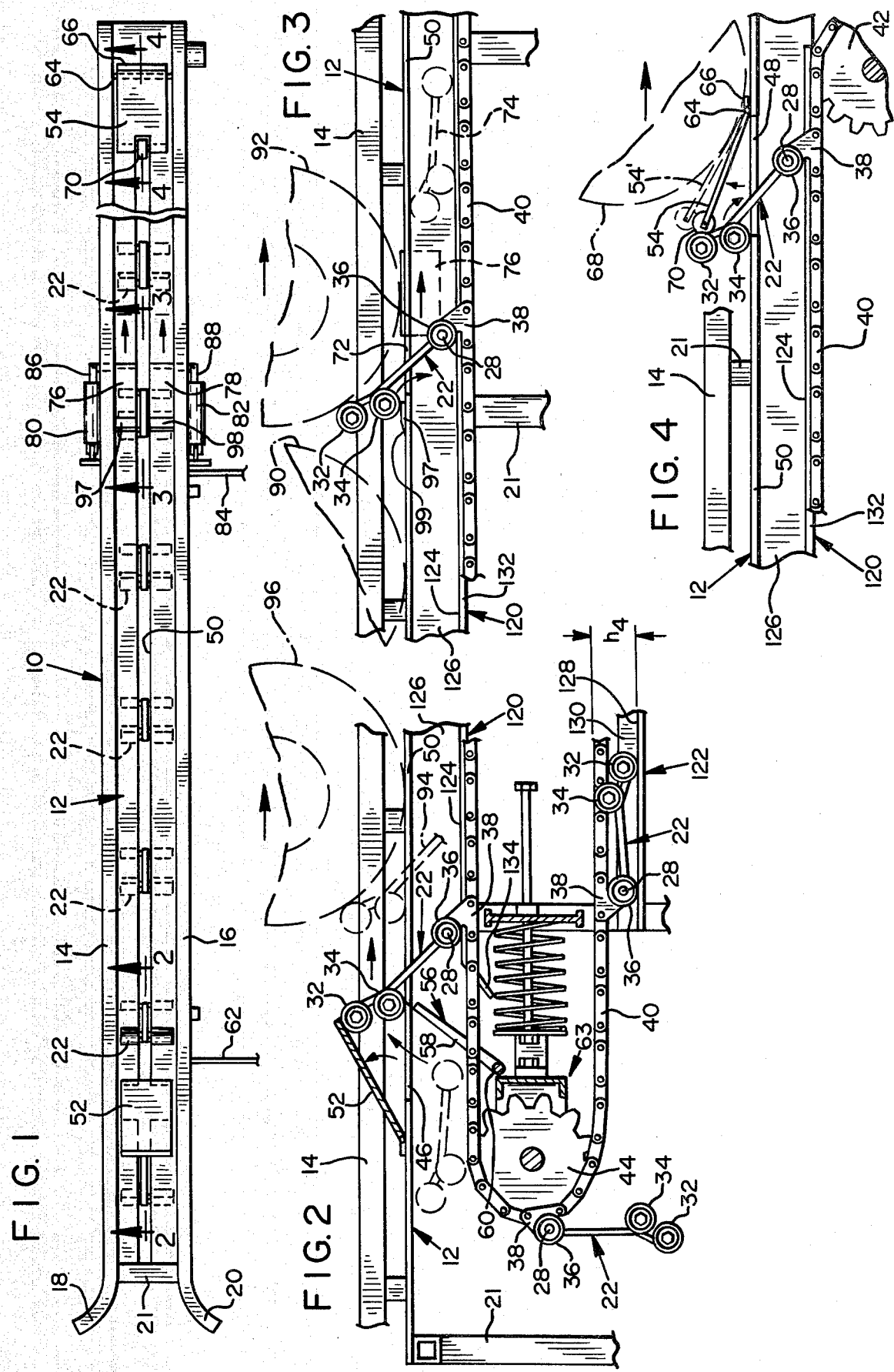

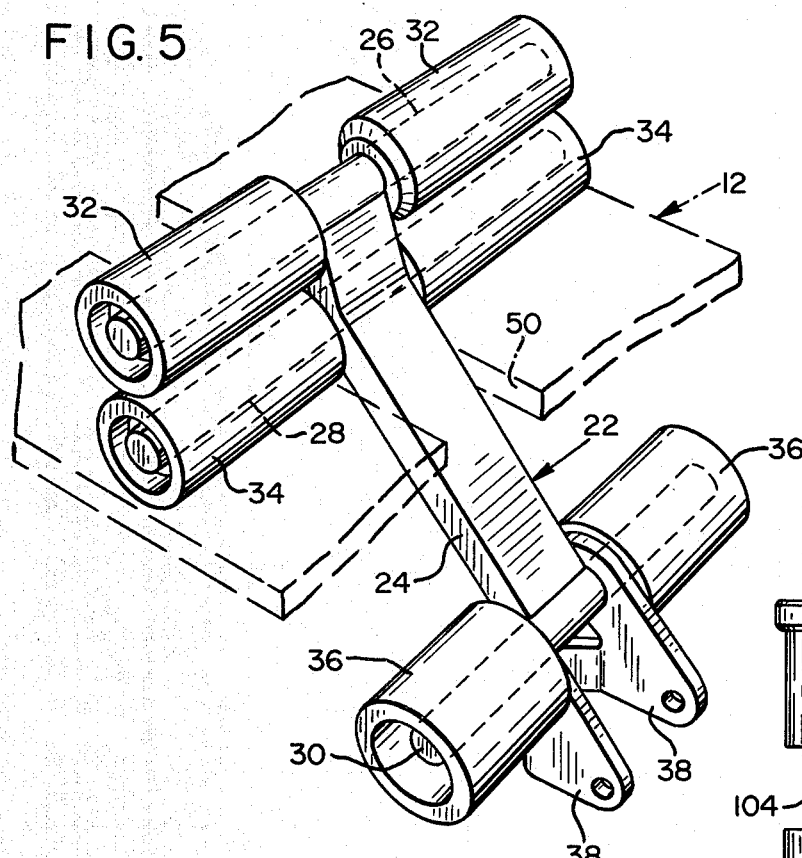
FIG. 5
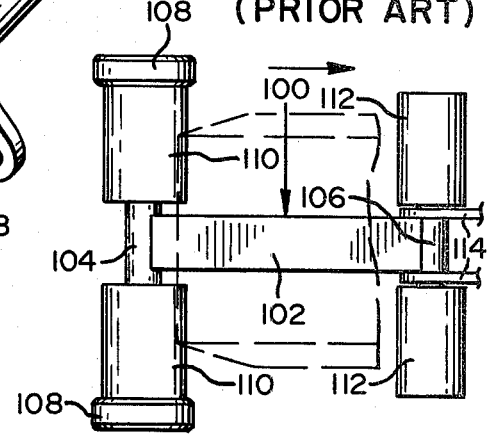
FIG. 6 (PRIOR ART)
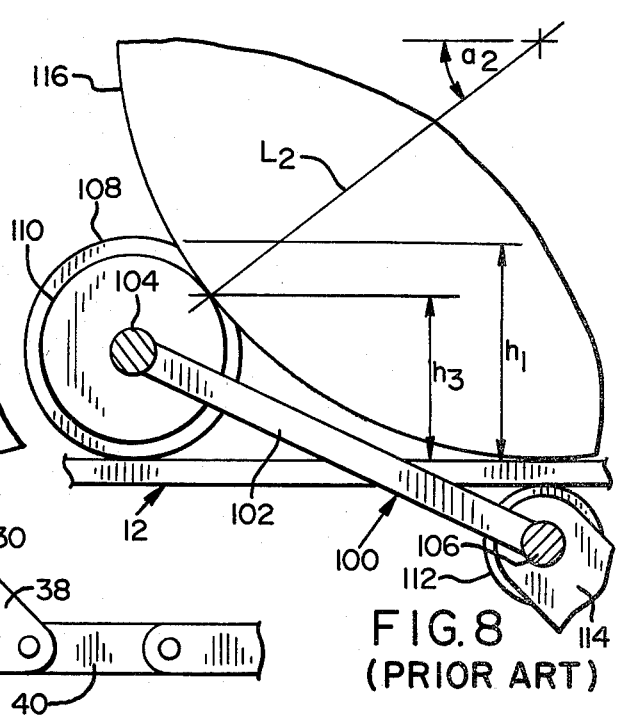
FIG. 7
FIG. 8 (PRIOR ART)

VEHICLE CONVEYOR

The present invention pertains generally to conveyors and more particularly to vehicle conveyors of the tire-engaging type for use in carwash systems.

The principal object of the present invention is the provision of an improved vehicle conveyor.

Another object is the provision of a more efficient vehicle conveyor.

Another object is the provision of a vehicle conveyor having a more efficient roller mechanism.

These and other objects as well as various inherent advantages of the present invention will become apparent from the following description of the presently preferred way of carrying out the invention, when read with the accompanying drawings, in which:

FIG. 1 is a plan view of a vehicle conveyor in accordance with the present invention;

FIG. 2 is a cross-sectional view taken along line 2—2 of FIG. 1 showing a forward portion of the conveyor on an enlarged scale;

FIG. 3 is a cross-sectional view taken along line 3—3 of FIG. 1 showing an intermediate portion of the conveyor on an enlarged scale;

FIG. 4 is a cross-sectional view taken along line 4—4 of FIG. 1 showing a rearward portion of the conveyor on an enlarged scale;

FIG. 5 is a perspective view of a roller mechanism for engaging the tires of vehicles in accordance with the present invention;

FIG. 6 is a plan view of a roller mechanism of the prior art;

FIG. 7 is a schematic vertical cross section of the roller mechanism of FIG. 5 depicting its relationship to a vehicle tire rolling on a conveyor track, only a lower rearward portion of the tire being shown; and FIG. 8 is a schematic vertical cross section similar to FIG. 7 but showing the prior-art roller mechanism in relationship to a vehicle tire and the conveyor track.

Referring to FIG. 1, a vehicle conveyor in accordance with the present invention is illustrated and designated generally by reference numeral 10. The conveyor 10 is an improvement upon the vehicle conveyor described in U.S. Pat. No. Re. 30,026, which is a reissue of U.S. Pat. No. 3,554,132, the terms of which are hereby incorporated by reference to the extent they are not inconsistent with the description which follows. The conveyor 10 includes a track 12 over which the tires on one side of a vehicle roll as the vehicle moves through the carwash. Guide rails 14 and 16 are provided at the sides of the track 12 several inches above the track surface in order to guide the tires of successive vehicles along the track 12. The guide rails 14 and 16 are flared apart at their front ends 18 and 20 to assist in the initial alignment of the tires for movement down the track 12. The track 12 and guide rails 14 and 16 are assembled on a frame 21 which is disposed in a subsurface pit in a suitable manner such as that described more fully in U.S. Pat. No. 3,554,132. A plurality of roller mechanisms or pushers 22 for engaging the tires of vehicles being conveyed through the carwash are provided at spaced intervals along a conveyor chain in a manner to be described more fully below with reference to FIGS. 2-4.

Briefly referring to FIG. 5, each pusher 22 comprises an arm 24 to which three shafts 26, 28 and 30 are secured in a suitable manner such as by welding. Pairs of rollers are journaled on each shaft on opposite sides of the arm 24 as shown. Specifically, two tire-engaging rollers 32 are journaled on the shaft 26, two track-engaging rollers 34 are journaled on the shaft 28, and two chain-guiding rollers 36 are journaled on the shaft 30. A pair of triangular plates 38 is also journaled on the shaft 30 for purposes to be described presently.

With reference now to FIGS. 2-4, an endless conveyor chain 40 is looped around a drive sprocket 42 at the rearward end of the conveyor (FIG. 4) and a take-up sprocket 44 at the forward end of the conveyor (FIG. 2), the sprockets 42 and 44 turning clockwise so that the chain moves from left to right along an upper course and from right to left along a lower return course. From the figures it will be appreciated that the triangular plates 38 serve as interconnecting links in the chain 40 so that each pusher 22 is hingedly connected to the chain by virtue of each pusher arm 24 and the adjoining shaft 30 being pivotable relative to the plates 38. As seen in FIG. 2, a first opening 46 in the track 12 is provided near the forward end of the conveyor 10 for selectively raising pushers 22 to engage the tires of vehicles to transport the vehicles along the conveyor. As seen in FIG. 4, a second opening 48 in the track 12 is provided near the rearward end of the conveyor 10 to permit pushers to return to the region below the track 12 just before the chain 40 is carried around the drive sprocket 42. The track 12 includes a narrow longitudinal slot 50 extending between the openings 46 and 48. The arms 24 of raised pushers 22 extend through the slot 50 while traveling along the conveyor 10. Hinged plates 52 and 54 are provided for covering the openings 46 and 48 respectively. The hinged plates, when closed, enable the tires to roll substantially uninhibited over the openings 46 and 48.

With particular reference to FIG. 2, a preferred lifting mechanism, which is designated generally by reference numeral 56, will be described. The lifting mechanism 56 includes two guide arms 58 (only one of which is shown) disposed on opposite sides of the chain 40 and secured to a shaft 60 transversely disposed below the upper course of the chain. The guide arms 58 are operable under the control of an operator or automatically in response to a vehicle position sensor, such as a pneumatic hose 62 and a cooperating responsive mechanism (not shown). When the need arises to lift the upper pairs of rollers 32 and 34 of a pusher 22 through the opening 46, the guide arms 58 are rotated counterclockwise from a normal horizontal position to the inclined position shown in FIG. 2 just after the chain-guiding pair of rollers 36 passes the outer ends of the guide arms 58. The track-engaging rollers 34 are then caused to roll up the guide arms 58 thereby pivoting the arm 24 about the axis of the shaft 30 and forcing the tire-engaging rollers 32 against the underside of the hinged plate 52 causing it to lift up and allow the roller pairs 32 and 34 to emerge above the track 12. As the pusher 22 moves away from the opening 46, the plate 52 falls shut and the guide arms 58 are returned to their normal horizontal position. Further details regarding the operation of the preferred lifting mechanism 56 are provided in U.S. Pat. No. 3,554,132.

It will be noted from FIG. 5 that the roller pairs 32 and 34 have an overall axial dimension slightly greater than that of the roller pair 36. Therefore, in a modified form of the lifting mechanism 56, the guide arms 58 (only one of which is shown in FIG. 2) can be spaced apart by a sufficient distance to allow the roller pair 36 to just pass through the arms 58 when in their inclined position while engaging the roller pair 34 to lift the roller pairs 32 and 34 up through the opening 46. In such an arrangement, the guide arms 58 can be lifted into position before the roller pair 36 passes the guide arms, which permits simplification of the construction and/or operation of the lifting mechanism 56 but requires closer attention to tight tolerances.

Another feature of the preferred conveyor 10 which is illustrated in FIG. 2 is the provision of spring-biased carriage for regulating the tension on the chain 40. The carriage is indicated generally by reference numeral 63 and is described in greater detail in U.S. Pat. No. 3,554,132. Briefly, the carriage 63 allows the sprocket 44 to move longitudinally within a defined range in response to the tension on the chain 40 and the opposing spring force of the carriage 63.

With particular reference to FIG. 4, the operation of the hinged plate 54 at the rearward end of the conveyor 10 will be described. The plate 54 has a hinge 64 disposed at the upper surface of the track 12 just rearward from the opening 48. A narrow flange 66, which extends rearwardly from the hinge 64, is permanently affixed to or forms an integral part of the plate 54 and is disposed at an angle of about 135° to the plate 54. Thus, when the tire, as indicated by the dashed outline 68, rolls over the flange 66, the weight of the vehicle alone will ordinarily lift the plate 54 to an inclined position of about 45° as shown by the dashed outline 54'. The plate 54 opens in this manner whenever a tire rolls over the flange 66 regardless of whether such tire is being engaged by a pusher 22. It will be understood, however, that each of the pushers that are traveling in the raised position with their rollers 32 and 34 above the track 12 will return through the opening 48 in the manner depicted in FIG. 4. The conveyor 10 has been designed to assure that all pushers traveling in the raised position upon reaching the opening 48 will return through the opening 48 even without the assistance of the vehicle tire lifting the plate 54. This is accomplished by providing a roller 70 on the forward end of the plate 54 in alignment with the slot 50 in the center of the track 12. Thus, when a pusher 22 traveling in the raised position, either alone or in engagement with a tire, reaches the opening 48, the roller 70 will roll up the inclined upper surface of the pusher arm 24 causing the plate 54 to open and allowing the pusher to drop down through the opening 48.

Now referring to FIG. 3, an important feature of the present invention will be described. Selected pushers 22 traveling in the raised position are returned to the lowered position via an intermediate opening 72 disposed between the first and second openings 46 and 48. The pushers which are returned to the lowered position then travel below the track 12 as indicated by the dashed outline 74, which is also the normal course of pushers that are not raised up through the first opening 46. This feature enables a vehicle to be conveyed initially by a pusher engaging a front tire until it moves just beyond the intermediate opening 72 and then enables the vehicle to be conveyed further by a pusher engaging a rear tire which by then has moved beyond the first opening 46. It will be appreciated that by first pulling a vehicle from a front tire and then pushing it from a rear tire in the foregoing manner, the conveyor 10 can be made shorter by about the length of a typical vehicle compared to the length of a prior-art conveyor which employs pushers that engage only the front tires of vehicles moving through the carwash.

With reference to FIGS. 1 and 3, a preferred mechanism for selectively returning pushers 22 through the intermediate opening 72 will be described. Cover plates 76 and 78 are slidably disposed on the track 12 and are separated transversely by a space corresponding to the width of the slot 50 in the track 12. Two-way actuable pneumatic cylinders 80 and 82 are provided for slidably opening the respective plates 76 and 78 from their closed positions depicted in FIG. 1 to open positions depicted in FIG. 3. In operation, the presence of an approaching vehicle is sensed in a suitable manner, such as by means of a pneumatic hose 84 over which the front right tire rolls. This causes the cylinders 80 and 82 to be actuated to extend respective rams 86 and 88 which are attached to side flange portions of the respective cover plates 76 and 78, thus moving the cover plates into their open positions. This occurs when the front left tire of the vehicle is approximately in the position indicated by the dashed outlined 90 in FIG. 3. The tire continues to roll forward over the opening 72 and onto the cover plates 76 and 78 to the position indicated by the dashed outline 92 at which time the pusher 22 in engagement therewith is preparing to drop through the opening 72. At the same time, another pusher 22 is emerging from the opening 46 in the manner indicated in FIG. 2. The vehicle pauses momentarily in its forward movement until this new pusher reaches the position indicated by the dashed outline 94 in FIG. 2 whereupon it engages the left rear tire indicated by the dashed outline 96. As the vehicle then continues its forward movement, the cylinders 80 and 82 are actuated to return the cover plates 76 and 78 to their closed positions. Actuation of the cylinders 80 and 82 is then inhibited until the vehicle has passed beyond the location of the opening 72 so that the pusher then engaging the left rear tire will not fall through the opening 72 but will continue by rolling over the plates 76 and 78 in their closed positions, such pusher then continuing to the end of the conveyor 10 where it falls through the opening 48.

In order to assist the pushers 22 in rolling over the front edges of the plates 76 and 78, narrow plates 97 and 98 which abut the plates 76 and 78 in their closed positions are provided on the track 12 just in front of the opening 72. The plates 97 and 98 are the same thickness of the plates 76 and 78 and have inclined or ramped front edges indicated by reference numeral 99 in FIG. 3.

Referring to FIG. 6, a roller mechanism or pusher of the prior art is indicated generally by reference numeral 100. The pusher 100 comprises an arm 102 which interconnects two shafts 104 and 106. Outer rollers 108 are journaled on the shaft 104 and are separated by a distance sufficient to straddle a conventional vehicle tire. Inner rollers 110 of a smaller diameter are journaled on the shaft 104 between the outer rollers 108. The roller pairs 108 and 110 are free to rotate in opposite directions, the rollers 108 engaging the tire track and the rollers 110 engaging the tire of a vehicle being conveyed through the carwash. Rollers 112 of a third pair are journaled on the shaft 106 as shown. To the inside of the rollers 112 and on opposite sides of the arm 102 are chain-link plates 114, which are also journaled on the shaft 106.

Referring now to FIGS. 7 and 8, the presently preferred pusher 22 will be compared to the prior art pusher 100 in relationship to a vehicle tire 116 rolling on the tire track 12. For purposes of this comparison, the vertical extension of the pushers above the track 12 is assumed to be the same and is designated as $h_1$ in each case. Those skilled in the art will appreciate that certain factors, such as the ground-to-chassis clearance of the automobile limits the maximum dimension of $h_1$. For ease of comparison, a dashed outline of the roller 110 of FIG. 8 is superimposed on the pusher 22 in the view of FIG. 7. It is known that the point of contact of touching circles lies on the line connecting their centers. Thus, from FIG. 7 it will be seen that the points of contact of the rollers 32 with the tire 116 will occur at a height $h_2$; from FIG. 8 it will be seen that the points of contact of the rollers 110 with the tire 116 will occur at a height $h_3$. It will, therefore, be appreciated that the pusher 22 of the present invention achieves a mechanical advantage over the prior-art pusher 100 since $h_2$ is greater than $h_3$. The higher the point of contact of a pusher with a vehicle tire, the greater will be the efficiency of the pusher in delivering the driving force of the chain 40 to push the vehicle forward.

From the foregoing, it will be understood that the provision of the tire-engaging rollers 32 and track-engaging rollers 34 on separate shafts 26 and 28 so that the axis of the tire-engaging rollers 32 is disposed at a height above the track 12 that exceeds one-half the overall vertical extension $h_1$ of the pusher above the track, increases the height of the point of contact with the vehicle tire 116 by comparison with that which results from such prior-art arrangements shown in FIG. 8 in which the axis of the tire-engaging rollers 110 is at a height equal to one-half the overall vertical extension $h_1$.

It has been found that even a small increase in the height of the point of contact between the pusher and the tire provides a substantial increase in the efficiency of the pusher. In order to more completely illustrate the significance of the improved pusher efficiency, a specific example will now be considered. The line connecting the centers of the roller 32 and the tire 116 is designated as $L_1$ in FIG. 7 and the line connecting the center of the roller 110 and the tire 116 is designated at $L_2$ in FIG. 8. In an actual test, the line $L_1$ was found to make an angle $a_1$ of 44° with the horizontal and the line $L_2$ was found to make an angle $a_2$ of 48° with the horizontal. The cotangent of each of these angles defines in each case the ratio of the horizontal and vertical components of the force of engagement between the respective pushers and the tire 116. The horizontal force component does work in moving the vehicle whereas the vertical force component is wasted effort. The ratio of such horizontal to vertical components is therefore a measure of the relative efficiencies of the pushers 22 and 100. The contangent of 44°=1.036. The cotangent of 48°=0.900. Therefore, in the present exxample, the inventive pusher 22 is about 15 percent more efficient than the prior-art pusher 100 (i.e., 1.036/0.900=1.151). Those skilled in the art will appreciate such an improvement in efficiency permits the use of a lower horsepower chain drive and reduces the energy consumption of the carwash.

Referring again to FIGS. 2-4, it will be seen that the pushers 22 travel along upper and lower channels which are adjacent to the upper and lower courses of the chain 40 and are designated generally by reference numerals 120 and 122, respectively. The upper channel 120 is defined by a horizontal pusher track 124 and two vertical sidewalls 126 (only one of which is shown). The lower channel 122 is defined by a horizontal pusher track 128 and two vertical side flanges 130 (only one of which is shown in FIG. 2). As the pushers 22 travel along the upper channel 120, the rollers normally roll on the pusher track 124 except that when a pusher is engaging the tire as shown in FIG. 7, the roller 36 is raised up in reaction to the forces acting on the pusher so that the roller 36 rolls on the underside of the tire track 12. When the pushers 22 travel in their lowered positions along the channel 120, the rollers 34 as well as the rollers 36 roll on the pusher track 124, in the manner indicated by the pusher 74 shown in dashed outline in FIG. 3. The pusher track 124 has a central longitudinal slot 132 through which the chain 40 normally passes in traveling along its upper course. The sidewalls 126 confine the lateral movement of the pushers 22 to keep the chain 40 aligned with the slot 132. The pusher track 124 has a downwardly inclined front end 134 as seen in FIG. 2 which serves as a ramp for the rollers 36 of approaching pushers. When the pushers 22 travel along the lower channel 122, the roller pairs 32 and 36 roll on the pusher track 128 and the side flanges 130 confine the lateral movement of the pushers to keep a chain 40 in substantial alignment with the sprocket 44.

Referring again to FIGS. 2, 3, 7 and 8, an additional feature of the preferred pusher 22 will be described. When the pusher 22 is traveling along its return course on the lower track 128, the vertical extension of the pusher above the track 128 is indicated by the dimension $h_4$ in FIG. 2. The rollers 32 and 34 preferably are identical in size, each having a diameter equal to about one-half the diameter (i.e., $h_1$) of the prior-art rollers 108. From FIG. 2 it will be seen that the dimension $h_4$ is approximately equal to 1.5 times the diameter of one of the rollers 32 or 34. It will also be apparent that pushers traveling in their normal lowered positions on the upper pusher track 124, as indicated by the dashed outline 74 in FIG. 3, will exhibit roughly the same vertical extension $h_4$ above the track 124. Thus, when traveling on the lower track 128 or when traveling on the upper track in its normal lowered position, the inventive pusher 22 has a vertical extension $h_4$ which is about 25 percent less than the vertical extension $h_1$ which would be exhibited by the prior-art pusher 100. This feature permits a reduction in the vertical space allocated to both the upper and lower channels 120 and 122 and thus permits a reduction in the overall depth of the conveyor 10.

From the foregoing description, it will be apparent to those skilled in the art that the present invention provides an improved and more efficient vehicle conveyor for a carwash. Although a preferred embodiment of the invention has been described in detail, it is to be understood that various changes, substitutions and alterations can be made therein without departing from the spirit and scope of the invention as defined in the appended claims.

What is claimed is:

1. In a conveyor having an endless chain for transporting a vehicle forwardly along a generally horizontal track, a roller mechanism for engaging a tire of the vehicle, the roller mechanism comprising:
    an arm having a first end hingedly secured to the chain and a second end remote from the first end;
    a first roller rotatably disposed on the arm near the second end;
    a second roller rotatably disposed on the arm intermediate the ends; and a third roller rotatably disposed on the arm near the first end;

the arm being selectively positionable relative to the track so that the axes of rotation of the rollers are horizontal and perpendicular to the direction of travel of the chain along the conveyor and so that the axis of rotation of the first roller is higher than the axis of rotation of the second roller, the first roller being carried entirely above the track in position to engage the tire of the vehicle when the tire is located forwardly of the first roller on the track, the second roller being disposed forwardly relative to the first roller and in position to roll on the track to position the first roller to engage the tire only, the axis of rotation of the first roller being disposed a distance above the track greater than one-half the vertical distance from the track to the highest point on the circumference of the first roller, the third roller being disposed forwardly relative to the second roller and in position to engage the underside of the track when the roller mechanism is engaging the tire and transporting the vehicle.

* * * * *